United States Patent
Pernia et al.

(10) Patent No.: US 9,146,549 B2
(45) Date of Patent: Sep. 29, 2015

(54) ELECTRICAL ENERGY USAGE MONITORING SYSTEM

(71) Applicants: Marcos B. Pernia, San Mateo, CA (US); Gilbert J. Masters, Belmont, CA (US)

(72) Inventors: Marcos B. Pernia, San Mateo, CA (US); Gilbert J. Masters, Belmont, CA (US)

(73) Assignee: ENMETRIC SYSTEMS, INC., Belmont, CA (US)

( * ) Notice: Subject to any disclaimer, the term of this patent is extended or adjusted under 35 U.S.C. 154(b) by 0 days.

(21) Appl. No.: 13/923,321

(22) Filed: Jun. 20, 2013

(65) Prior Publication Data

US 2013/0304268 A1   Nov. 14, 2013

Related U.S. Application Data

(63) Continuation of application No. 12/251,449, filed on Oct. 14, 2008, now Pat. No. 8,494,686.

(60) Provisional application No. 60/979,859, filed on Oct. 14, 2007.

(51) Int. Cl.
  G05B 15/02   (2006.01)
  G06F 1/26    (2006.01)

(52) U.S. Cl.
  CPC *G05B 15/02* (2013.01); *G06F 1/26* (2013.01); *G06F 1/266* (2013.01)

(58) Field of Classification Search
  None
  See application file for complete search history.

(56) References Cited

U.S. PATENT DOCUMENTS

| | | | |
|---|---|---|---|
| 5,264,761 A | 11/1993 | Johnson | |
| 5,875,087 A | 2/1999 | Spencer et al. | |
| 6,828,695 B1 | 12/2004 | Hansen | |
| 6,993,417 B2 | 1/2006 | Osann, Jr. | |
| 7,257,466 B2 | 8/2007 | Kreiner | |
| 7,555,365 B2 * | 6/2009 | Bhakta | 700/286 |
| 7,657,763 B2 * | 2/2010 | Nelson et al. | 713/300 |
| 8,156,055 B2 | 4/2012 | Shimada | |
| 8,433,530 B2 | 4/2013 | Shimada | |
| 2003/0050737 A1 | 3/2003 | Osann, Jr. | |
| 2006/0284604 A1 * | 12/2006 | Qi et al. | 322/7 |
| 2007/0055889 A1 | 3/2007 | Henneberry et al. | |
| 2008/0106147 A1 * | 5/2008 | Caggiano et al. | 307/39 |
| 2010/0145542 A1 * | 6/2010 | Chapel et al. | 700/295 |

* cited by examiner

*Primary Examiner* — Sean Shechtman
*Assistant Examiner* — Steven Garland
(74) *Attorney, Agent, or Firm* — Sherman D. Pernia

(57) ABSTRACT

Disclosed is a system and method having one or more networked modular sensors Nodes and a data processing/display for use to monitor and control electrical appliance loads at a premises. The modular sensor Nodes and the processing/display system detect, process, and manage real-time and historic electrical energy usage data for the premises, allowing the management of energy usage by a user of the system through manual and automated usage controls. The sensor Nodes are integrated into the standard form-factors (i.e., the standard physical configuration) of components typical of household and commercial electrical interfaces, such as circuit breakers, wall outlets, light switches, plug ends, power strips. The Nodes are configured in the standard form-factor of typical electrical interfaces to allow them to be substituted for the existing electrical interfaces and used with appliances or other load devices already existing or to be added at the premises.

1 Claim, 6 Drawing Sheets

ELECTRICAL ENERGY USAGE MONITORING SYSTEM

CONTINUITY DATA

The present invention claims the benefit of prior filed U.S. Provisional application Ser. No. 60/979,859 filed 14 Oct. 2007, and is a continuation of prior filed U.S. Non-Provisional application Ser. No. 12/251,449 filed 14 Oct. 2008 (pending/allowed), the content of which prior applications is incorporated herein by reference.

FIELD OF THE INVENTION

The present invention is directed to an apparatus, system and method for measuring real-time electrical energy usage at a private residence, commercial property, or other facility which is electrically connected to one or more external power sources, such as a power grid, and not only monitoring gross electrical energy usage, but allowing for the granular monitoring of the constituent load endpoints constituting aggregate usage. The present invention is further directed to a method for the management, processing, display and remediation of electrical energy usage.

BACKGROUND OF THE INVENTION

Making homes, vehicles, and businesses more energy efficient, with the goal of energy conservation, is seen as a largely untapped solution to addressing escalating consumer costs, energy security, global warming and overall ecological responsibility. Unfortunately, though propositions for energy efficiency first found the forefront during the 1973 oil crisis, efficiency and conservation have historically taken a secondary position to new power generation as a solution to global energy woes and the creation of national energy policy. Despite energy efficiency and conservation proving to be cost-effective strategies for building economies without necessarily growing energy consumption, the benefits of which are not lost to the high volume energy consumers such as commercial and other large facility consumers, residential consumers remain largely unaware of the potential benefits of efficientizing their energy usage; indeed, most consumers have little or no visibility into their own usage patterns, let alone the availability of alternate energy sources, rate plans and subsidies, or other government or utility sponsored programs that may reduce both cost and waste. Even the relative few with both access to and an understanding of their usage metrics, lack an intelligent method with which to utilize that data to weigh or manage the cost, quality of service, environmental impact or value added services of the available utility providers plans and programs.

Fostering consumer participation in efficient utility usage and enabling consumers to shop more intelligently for utility services requires they have easy access to a comprehensive set of easily understood and digested usage and billing data. For such a system to be most effective, it needs to examine not only gross consumption, but allow for granular visibility into usage across a users entire electrical system, additionally, it must succeed in presenting this data in a manner that provides, visibility, education and the ability to pro-actively remediate usage, both automatically and through an intuitive interface. To empower consumers, a system of this type might include services such as the presentation of real-time and historical cost and usage statistics, cost/trend analysis, the ability to propose or automatically implement optimizations to electrical usage profiles, recommend optimal electrical device/appliance/fixture retrofitment, facilitate consumers tailoring their participation in dynamic pricing options made available by utility providers, present comparative data in a standardized format (such as the Nutritional Facts standard implemented on food stuffs) allowing consumers to shop more intelligently by directly comparing cost analysis as well as quality of service and other data between utility providers, and much more. Additionally, an optimal implementation would provide a portal through which a consumer community could develop and share information and knowledge, further engaging and educating users.

Recent years has seen several products come to market in hopes of addressing some of the aforementioned consumer needs. The P3 Industries "Kill-a-Watt" and Electronic Educational Devices "WattsUp" units, for example, allow consumers to monitor the electrical energy consumption of an individual appliance, but provide no method for gathering a "total" view of the entire residence. Conversely, products such as Energy, Inc.'s "The Energy Detective", provide the user with a "total" view of the residence, but provide no granular method for viewing the electrical energy consumption of specific appliances/loads within the residence. Still other companies have attempted to address these needs via custom, site-specific installations; such an approach requires a significant financial investment by the user in the professional installation of expensive custom hardware and dedicated computer server equipment.

Disrupting, indeed changing the current energy consumption paradigm demands a system yet unavailable to utility consumers; a system inclusive of all the aforementioned functionality, but packaged in such a way as the hardware components required are indistinguishable from the standard electrical interfaces they replaces in a typical residential or business electrical system and being a 'plug and play' system that requires minimal, if any, professional installation, is extensible, scalable, and inexpensive; additionally including a highly intuitive and easy to use interface to a comprehensive set of usage and cost data as well as tools to both moderate and remediate energy consumption.

SUMMARY OF THE INVENTION

The present invention is an apparatus, system and method consisting of one or more networked modular electrical energy sensors (Nodes) integrated into the standard form factor of common electrical interfaces, such as electrical circuit breakers and wall outlets and replacing those interfaces in an residential or business electrical system. The described Nodes monitoring electrical usage and state, including current, voltage, volt amps, power, phase, line noise and power factor, additionally being capable of controlling the state of the interface, such as breaking, reinstating or cycling the electrical connection to an attached load. Electrical usage and state data collected by the Node is communicated to a management and display console (Console) for processing, management and display. The Console being an electronic computer capable communicating with Nodes and other connected resources or systems, processing and persisting data for display, and presenting user, and other common input/output interfaces for interacting with the system. Installed on the Console system is software (Software) for performing the processing, management and display of electrical energy usage and state data, also allowing users to control or manipulate said data and the Nodes, Consoles and other associated resources networked to the management and display console. The Software further providing a user interface for programming the system and interacting with collected data; facilitating the presentation of real-time and historical cost and usage statistics, both visually, such as through a floor plan view of cost and usage across the monitored electrical systems circuits/rooms/outlets/fixtures/appliance or cost/usage reports or projections generated for review. The type of information gleaned may include simple data such as a color indicator of the state of electrical energy usage for a site, or more detailed processing such as cost and usage statistics, cost/trend analysis, usage and cost forecasting, the ability to propose or automatically implement optimizations to electrical usage profiles, recommendation of optimal electrical device/appliance/fixture retrofitment, fostering consumers tailoring their participation in dynamic pricing options made available by utility providers, providing visibility into "what if" usage and cost scenarios/forecasts, presenting comparative utility provider data in a standardized format (such as the Nutritional Facts standard implemented on food stuffs) allowing consumers to shop more intelligently by directly comparing cost analysis as well as quality of service and other data between providers, and the presentation of any other metrics derivable from the data points collected by the Nodes.

The Node sensor circuit detects and measures the electrical energy usage characteristics of any attached load(s), including Power, Voltage, Amperage, Phase, Power Factor, Volt-Amps, line frequency, and noise.

The Node processing circuit interprets and carries out instructions provided by the embedded software. It tests and manipulates data, and transfers information to and from other components within the sensing/detecting node, such as the working memory, the communication interface, cutoff circuit, status indicators or management interface.

The Node memory associated with the processing circuit is used as a temporary store of data that may be changed, deleted, or otherwise manipulated.

The Node load controller circuit provides a means to electrically connect and disconnect, as well as vary the duty cycle of, the attached load.

The Node communication controller and interface circuits provide the means of sending data from the Node to the other system components, and to receive data from the other system components.

The Node power supply circuit supplies the Node's circuitry with the necessary operational electrical power.

The Software is the associated set of programmatic instructions for the management and processing of the electrical energy usage data collected by the system: the display of said data, the collection of user input, the issuance of remediation and control commands and communications to and from other system components and remote services as well as communication with extracurricular assets.

The Management and Display Console hardware provides the physical means for running the Software, displaying the Software output through associated displays and indicators, collecting user input via common user input devices and methods, and communications interfaces for exchanging data with system components and with associated TCP/IP networks.

DETAILED DESCRIPTION OF THE INVENTION

Figure 1:
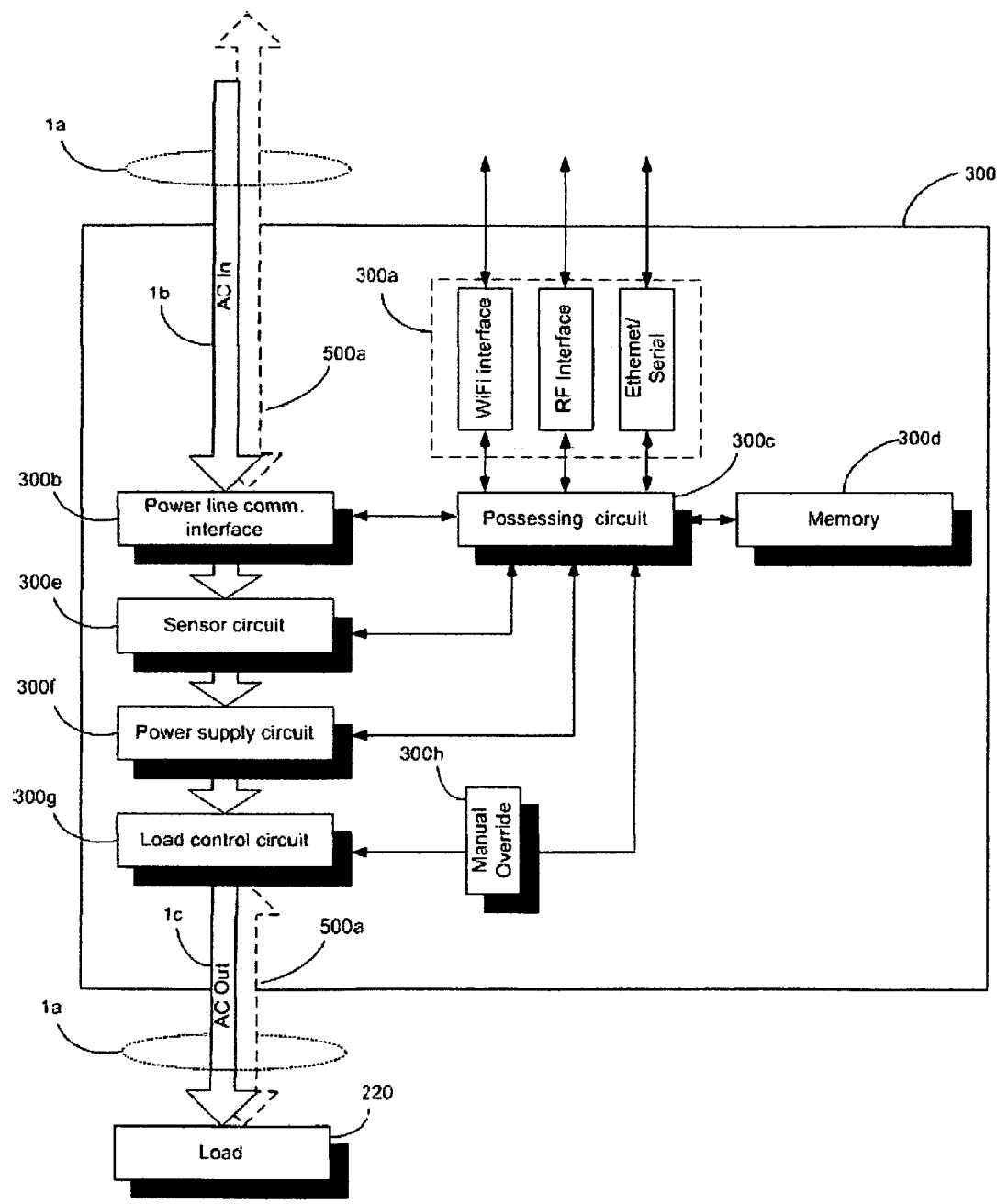
FIG. 1 is a block diagram representing the component ensemble constituting the energy sensing/detecting nodes responsible for both monitoring and reporting electrical energy usage/consumption data as well as implementing remote control mechanisms of the proposed system.

The following detailed description presents an embodiment of the invention providing an apparatus, system and method consisting of networked modular electrical energy sensing/detecting/controlling apparatus (Nodes), an data management and display system/appliance, and an data management, processing, display and control software (Software) to detect, process, manage, present and control both real-time and historic electrical energy usage data (metrics, statistics, etc), additionally allowing the intelligent management of energy usage through consumer education as well as both manual and automated usage controls.

Wherein Nodes are integrated into the standardized form-factor components typical of household and commercial electrical interfaces, such as circuit breakers, wall outlets, light switches, plug ends, power strips, etc, additionally allowing integration with appliances or other load devices and being capable of processing data;

Wherein sensors and the associated management, processing and display systems are capable of bidirectional communication over a multiplex of communication mediums.

The preferred embodiment will be described with reference to the accompanying drawings and use cases and broken into 3 sections to better describe the present invention. Section one will provide a hardware level overview of the Node in its preferred embodiment. Section two will describe the invention in its preferred embodiment implemented in an common electrical system environment. Section three will be a description of the preferred embodiments management and display console appliance and associated software system for management, processing, presentation and remediation of electrical energy usage across several use cases.

Referring now to the drawings, the details of preferred embodiments of the present invention are graphically and schematically illustrated. Like elements in the drawings are represented by like numbers, and any sub-components of the same element are represented by like numbers with a different lower case letter suffix, additionally, an asterisk (*) in lieu of a lower case letter designation denotes all sub-components of the parent element.

Electrical Energy Sensing/Detecting/Controlling Node

Turning now to FIG. 1 there is provided a schematic illustration of the described sensing/detecting system, referred to as Node (300) and representing a preferred embodiment of said component of the present invention. The Node system (300) includes 6 principal components: 1. an sensing/detecting component (300e); 2. an processing component (300c); 3. an memory component (300d); 4. an load control circuit (300g); 5. an data communication component (300b); 6. an power supply component (300f); 7. an load control manual override component (300h) and 8. an management/communication interface (300a)

The sensor circuit (300e) measures the electrical energy usage characteristics of any attached load (220), including power, current, voltage, phase, volt-amps, power factor, line frequency, and noise, and relays that data to the processing circuit (300c) for handling.

The power supply circuit (300f) draws power directly from the attached line (1a), to supply electrical power for the Node's (300) operations. The processing circuit (300c) will monitor the power supply circuit (300f), in order to optionally include or exclude the electrical energy usage characteristics of the Node (300) itself from measurements.

The Load control circuit (300g) provides a means to disconnect or cycle the electrical power to the attached load (220). The load control circuit (300g) receives instructions from the main processing circuit (300c), in response to instructions received via an communications interface (300a, b) or in response to an locally detected events or pre-programmed conditions. The load control circuit (3000 includes a manual override switch (300h), so that this behavior may be optionally disabled by the user.

The Communications Interface circuits (300a,b) provides a means for sending and receiving data to and from any of the inventions discrete component system's such as, to send and receive data to and from an Node (300), to and from an Data Management and Display console (FIG. 2) or an conglomerate of the inventions discrete component system's as well as any other device capable of communicating in a compatible protocol. The Communications circuits (300a,b) may employ any of the optionally offered wired or wireless communications methods and associated interfaces, including IP (Ethernet) over power line (300b), 802.11 Wifi, Bluetooth, 802.15.4 (zigbee), Ethernet, Serial (USB, RS-232, etc), etc. Additionally, the communications interface (300e) may be described as a "Management" interface, for the purposes of direct communication with a personal computer for the initial set-up and configuration as well as ongoing management and maintenance of an Node.

The processing circuit (300c) is responsible for collecting, processing, and managing data including, but not limited to, the storage and retrieval of data in memory (300d), sending and receiving data via the communications interfaces (300a, b), managing/controlling the power supply (300f) and Load control (300g) circuits and interpreting and executing commands.

System Environment

Figure 2:
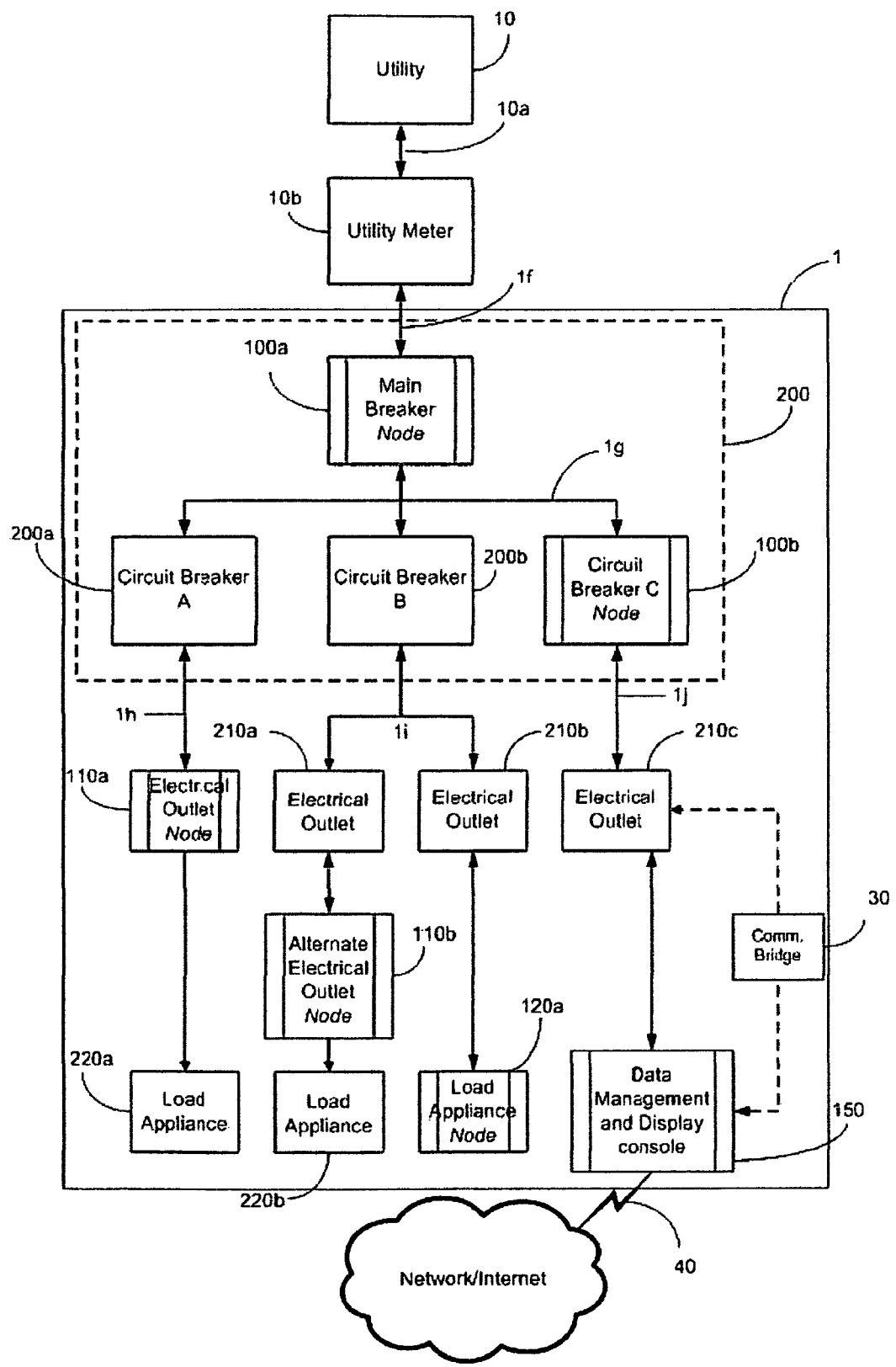
FIG. 2 is a block diagram of the preferred embodiment implemented on a preferred type electrical system and hardware; shown are multiple instances of the proposed technology installed at a multitude of possible electrical energy monitoring endpoints in the electrical system, and including the presence of a data processing, management and display console with the Software installed.
Figure 3:
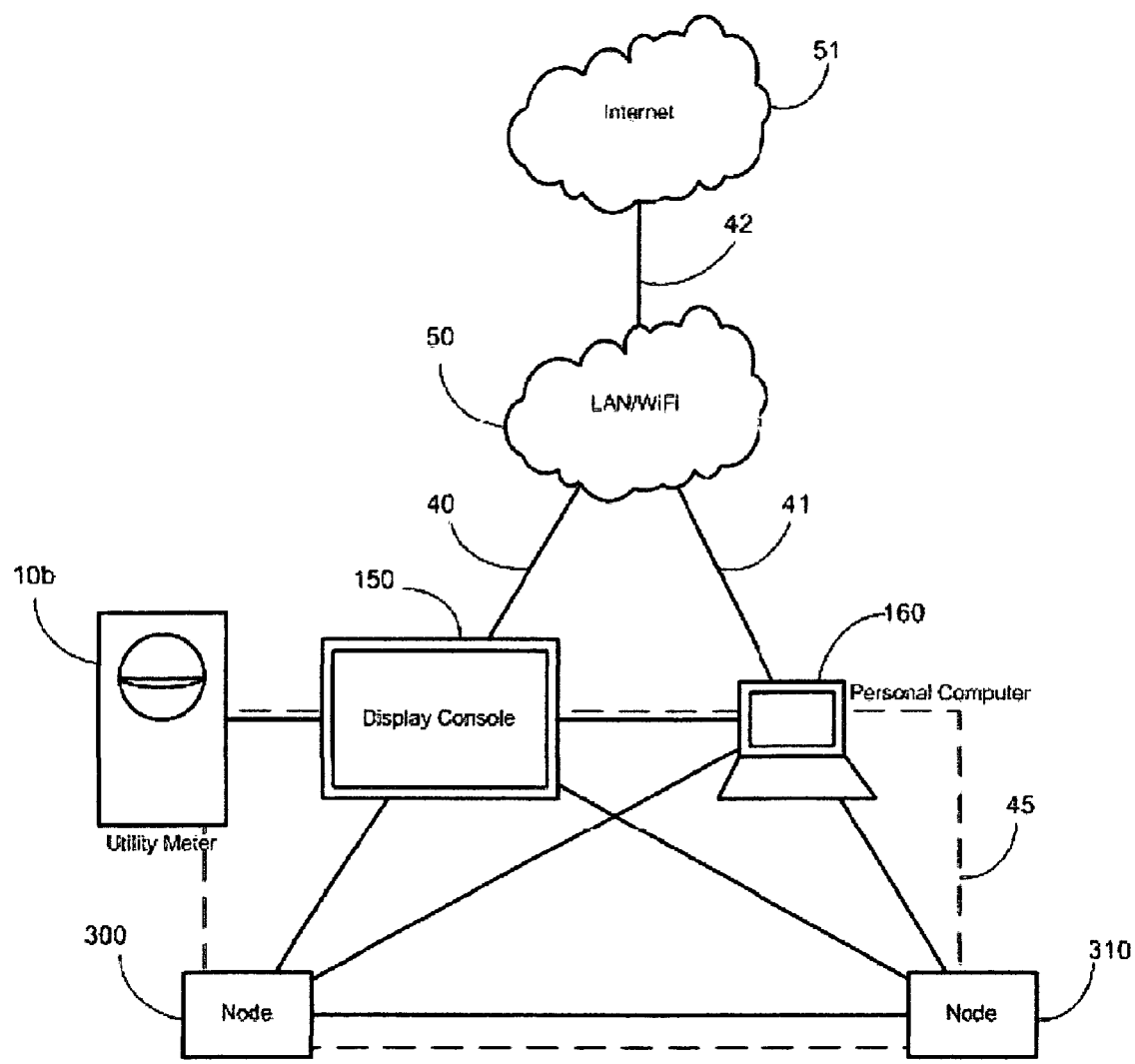
FIG. 3 is a block diagram representing the intercommunication between disparate components of the preferred embodiment when implemented on a preferred type electrical system and hardware; the amalgamated sensing/detecting nodes and their associated management and display console constituting the proposed invention.

The description of FIGS. 2 through 3 will provide a comprehensive view of the preferred embodiment implemented on a preferred type electrical system and hardware, but is not intended to limit the applicable environments. One of ordinary skill in the art will recognize that the present invention can be implemented with the accompaniment of other electrical system configurations; Large facility/commercial electrical systems, 'off grid' or self contained electrical systems and fractional electrical systems that use a plurality of power sources are examples of such. One can appreciate that the present invention can also be practiced in combination with remote processing, data storage, and user interface, whether over a distributed network or via removable hardware or media directly interfacing the proposed hardware.

As shown in FIG. 2, power is typically delivered to consumers by a utility service provider (10) via utility lines (10a) and the consumers electrical energy usage monitored by the utility supplied electricity meter (10b). Typically the utility supplied electricity meter (10b) feeds directly into distribution panel (200), in which an optional Main Circuit breaker (100a) and an multitude of distribution circuit breakers (100*,200*) reside. The distribution circuit breakers (100*, 200*) then feed any number of electrical outlets (110*,210*) throughout the electrical system (1*), which in turn are connected to any number of load appliances (120*,220*). Alternatively, a distribution circuit breaker (100*,200*) may directly feed a load appliance (120*,220*) such as a washing machine or water heater.

The described system provides a means for installing a Node at any point along the electrical path between the load appliance (120*,220*) and the electrical energy source (e.g. The Utility meter 10b), by way of packaging an Node into standardized form-factor electrical interfaces, such as an circuit breaker (100b), electrical outlet (100a), multi-plug adapter (110b), or within the load appliance itself (120a). This will provide the end user with a multitude of options for measuring and controlling electrical energy usage across an entire electrical system (1) at a very granular level as well as in total.

FIG. 3 defines one of many possible arrangements and relative locations of the different Nodes (300,310), data management and display Consoles (150) and electronic Computer Systems (160) when implemented on a preferred type electrical system. Installed on both the Console (150) and the Computer System (160) is the proposed Software, facilitating communication with the Nodes (300,310) other Consoles (150) and Computer Systems (160), alternatively, an Computer System (160) excluding the Software may still communicate with an Console (150) or other Software enabled Computer Systems (160); further, Consoles (150) and Computer Systems (160) are capable of communicating with resources decoupled from the local electrical system.

Illustrated is a typical communications map of the described system. Using any of the offered communications methods over power line (IP/Ethernet, HAN), 802.11 Wifi, Bluetooth, 802.15.4 (zigbee), Ethernet, Serial/USB, etc.), each Node (300,310) and display console (150,160) may communicate bi-directionally with any other Node (300,310) or Console (150), forming a 'meshed' communication network (45). For example, a Node (300) that is packaged inside a circuit breaker may use an IP over power Line interface to communicate over the home wiring (FIG. 2-1j) with a Console (150). The display console (150) may relay data via 802.11 Wifi to a second node (310) that is integrated directly into a load appliance.

The Console (150) includes optionally an wired or wireless Ethernet interface for connecting to the end user's Local Area Network (LAN) and/or Wireless Local Area network (WLAN)(50), facilitating communication with the end user's Computer System (160). Alternatively, an Ethernet to power line bridge (30) may be employed to allow direct communications from the Computer System (160) to the Nodes and/or Console. The Data Management display console is connected to the Internet (51) via the end user's LAN or WLAN (50), allowing for data to be sent to/from remote locations.

A Console (150) or Computer System (160) may also include an Home Area Network (HAN) interface for communicating directly with the utility supplied electricity meter (10b).

Figure 4:
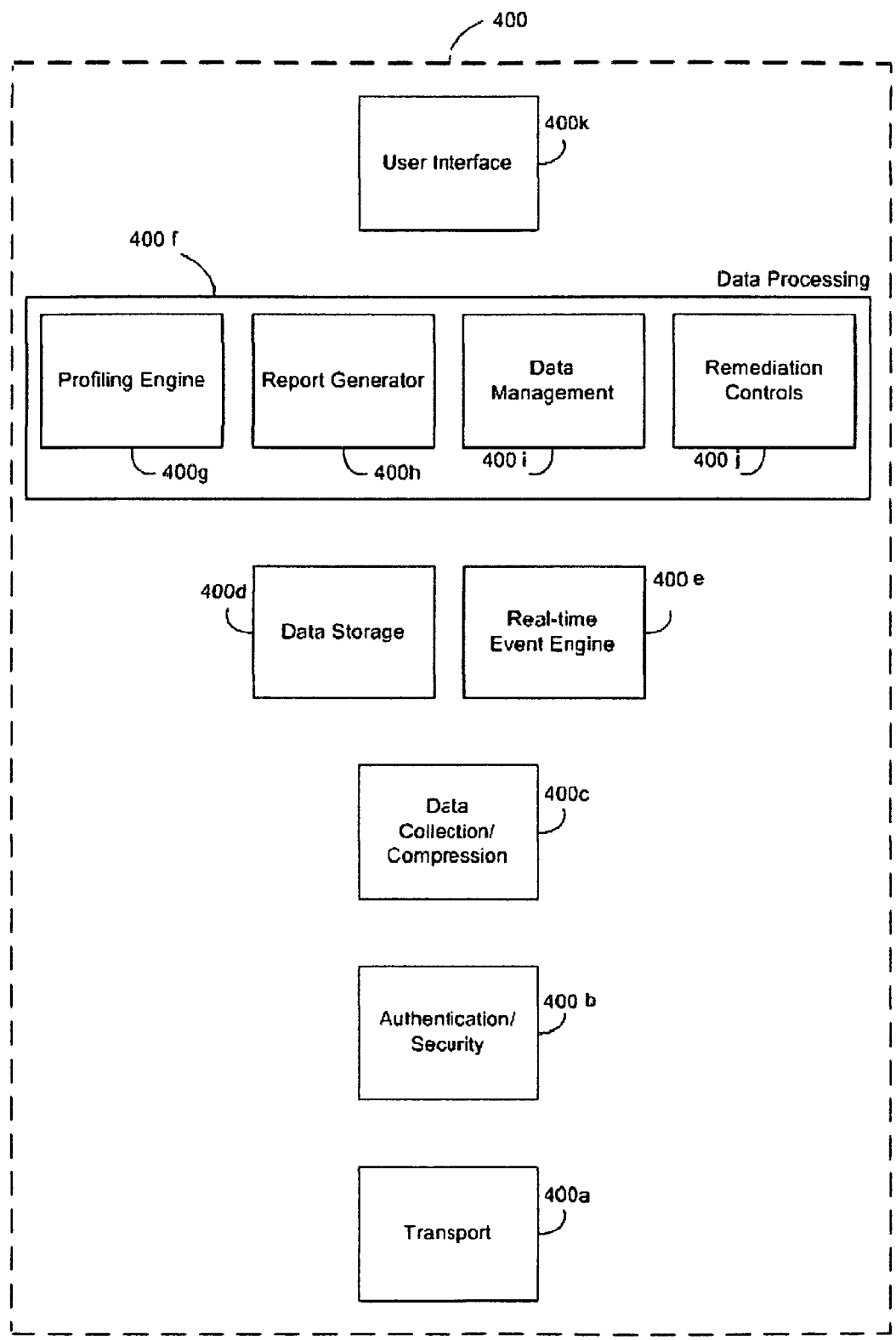
FIG. 4 is a block diagram representing a high level view of the major software components or modules comprising the proposed software system (Software) in its preferred embodiment.
Figure 5:
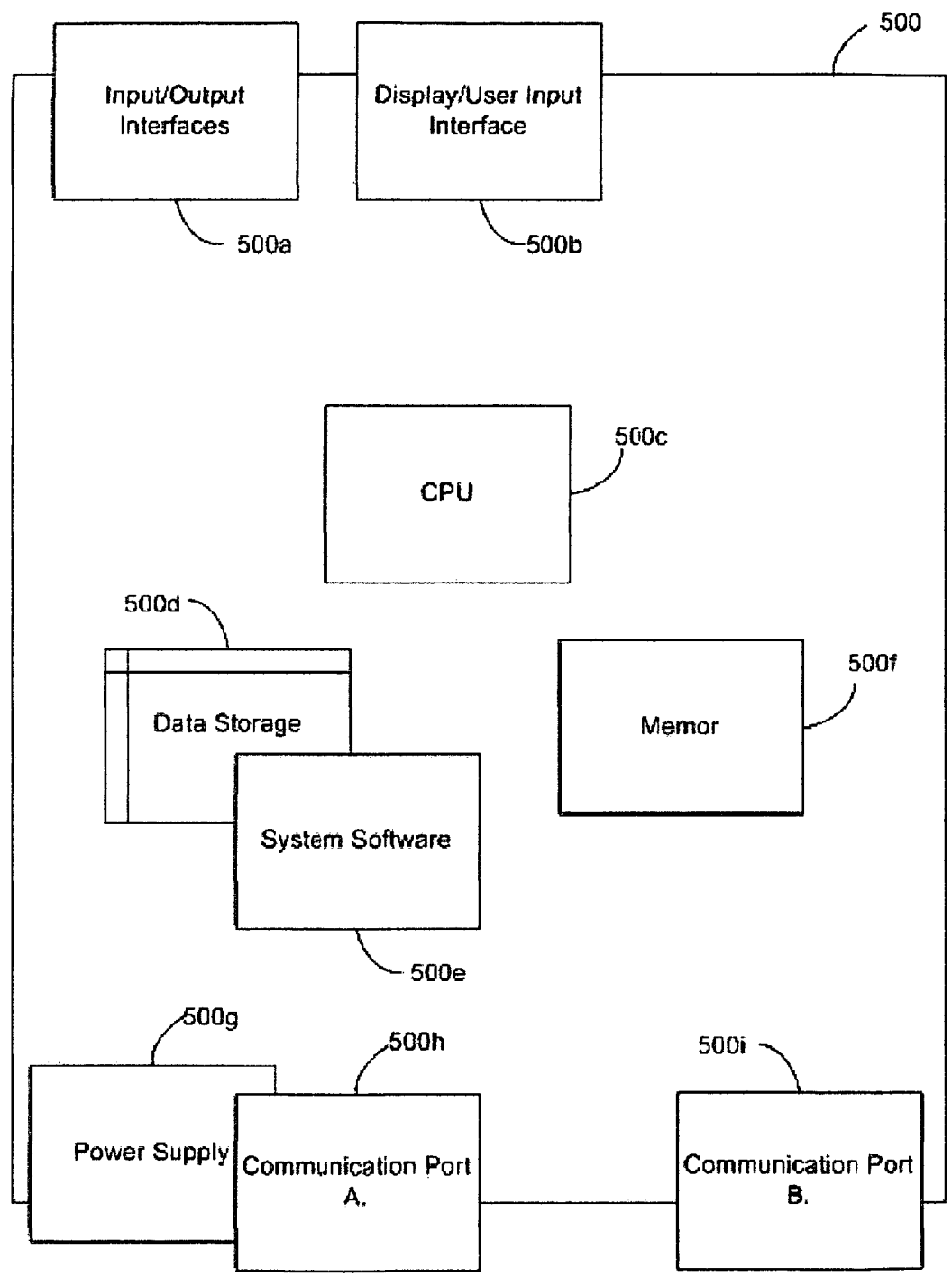
FIG. 5 is a block diagram defining the major hardware components comprising the preferred embodiment of the Console apparatus of the proposed invention.
Figure 6:
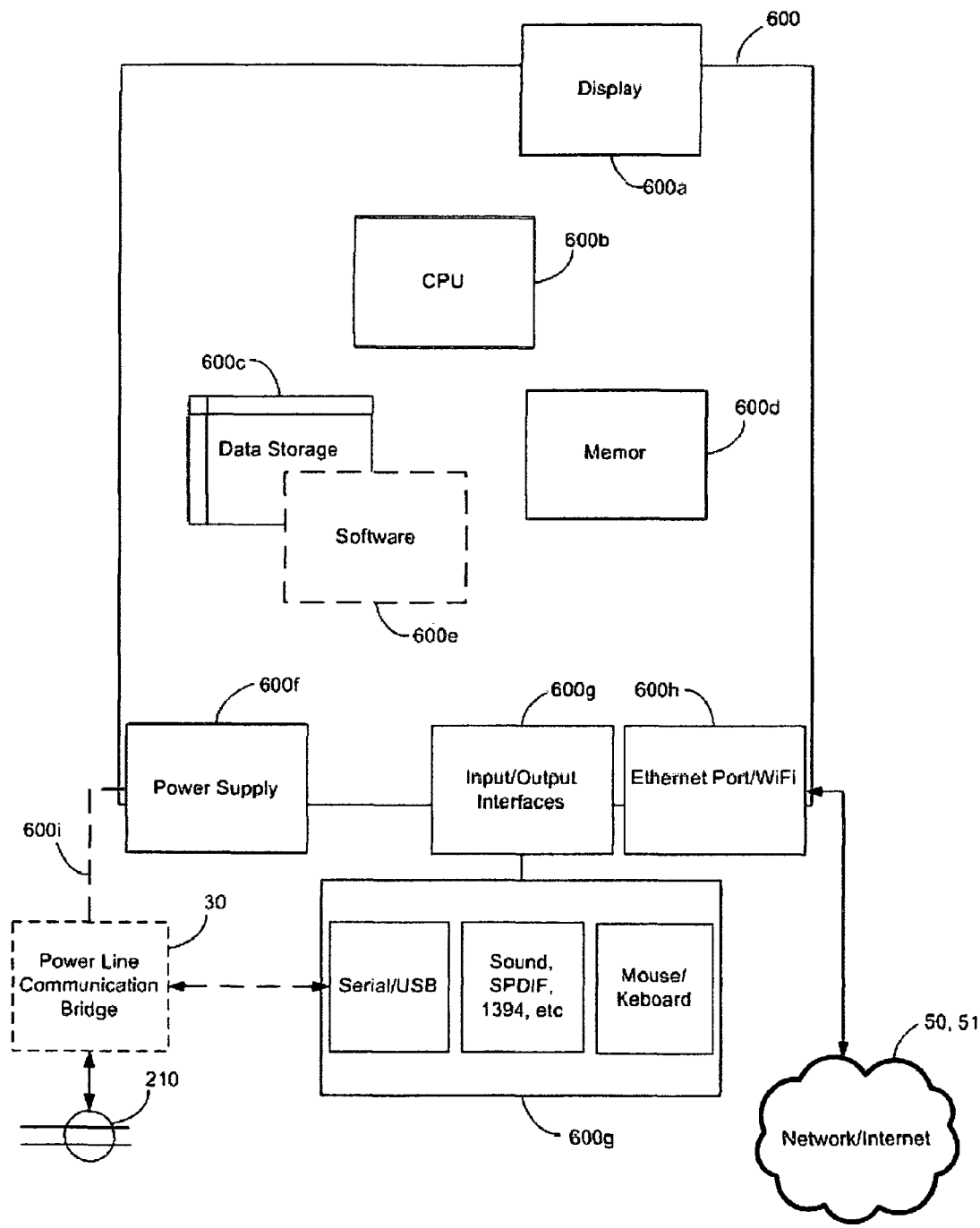
FIG. 6 is a block diagram of a typical personal type electronic computer system (PC) with the proposed Software installed additionally including a device for bridging communications between said Software and the communication medium native to the Node and Console systems proposed by the invention in its preferred embodiment and implemented in an typical residential or commercial electrical system environment.

Electrical Energy Management, Processing and Display Console and Software System Following is described FIGS. 4 through 6 and a description of each section in the use case template that addresses the attached use cases UC1. See Appendix. Describing FIG. 4 will illustrate the components comprising the Software, FIG. 5 describing the data management and display console appliance (Console), FIG. 6 describing the proposed software (Software) implemented on a personal computer and the final section providing a description of each section in the use case template coupled with Use Case(s) UC. 1, which are used primarily to capture the high level user-functional requirements of one embodiment of the Console and the installed Software system component of the proposed invention.

As shown in FIG. 4 and according to one embodiment of the inventive Software (400) there is represented a high level view of the major software components or modules comprising the proposed software system (Software) (400). Said Software (400) being responsible for sending and receiving data between the local Software (400) instance and Nodes, Consoles, PC's running additional instances of the Software (400) and other resources residing on the local electrical system, the local area network or a wide area network such as the Internet, additionally being responsible for processing, managing, persisting and displaying data, as well as receiving and processing user input.

Communication of data is managed by the Transport module (400a) a system for communicating messages between resources such as Nodes and other Software instances, and the component modules of the local Software instance (400) and comprises an incoming connection component, a core logic component, and an outgoing connection component. The incoming connection component receives messages from a sending resource and wraps the messages as a generic object in a message object. The core logic component is coupled to the incoming connection component and receives the message object from the incoming connection component. The outgoing connection component is coupled to the core logic component and receives the message object from the core logic component, unwraps the message object to retrieve the message, prepares the message for delivery to a destination module such as the Authentication module (400b) or the data collection module (400c), and delivers the message to said module. The incoming connection component, the core logic component, and the outgoing connection component have standardized interfaces and function together as an integrated unit.

The security module (400b) is responsible for authentication, authorization and cryptographic services. Component modules of the Software system (400) request services from the security module (400b) such as authentication of a package received by the Transport module (400a) or authorization of a user or resource to manipulate data managed by the Software (400). The described module may be pluggable and is derived from common interfaces, protocols and standards, insuring flexibility, extensibility and interoperability across implementations.

The data collection/compression module (400c) is a multipurpose data compression module responsible for compressing data supplied by a Node or other resource of a collective network such as the local electrical system or the Internet in response to a request from an Console or other device with an instance or the Software (400) running, which consists in: providing a data compression module (400c), that is inclusive of a data collection component designed to receive data supplied by the Software (400), an Node or other resource and redirect it towards the compression component of the module, said collection component being also designed to receive data from the compression component and redirect it towards the consulting module. The method further consists in: examining in the request an indication concerning decompression aptitude of the consulting module and performing in the compression component, on the data required by said request and supplied by the Software (400), Node, module (400*) or other resource a compression adapted to the indications concerning decompression aptitude contained in the request.

The data storage component (400d) is a structure responsible for storing collected data and other information organized in such a way that the Software (400) or an component module (400*) may quickly select desired sets of data.

The real-time event engine (400e) is responsible for managing a data stream from the data collection and compression module (400c) for real-time display, such that data is not stored post display. Additionally generating event alerts based on the analysis of said data, through both display and other event notification methods and an automated remediation system.

Data processing components (400f) are responsible for the majority of user driven data processing and comprise several logical components:

The Profiling Engine (400g) is responsible for analyzing data and identifying patterns per the set of decided-upon profiling variables, such as usage statistics for identifying a load appliance, or devices based on either known signatures or an AI driven by pre-programmed or learned patterns.

The Report Generator (400h) is responsible for facilitating the generation of generic reports whose data sets are defined by the Software (400) or custom reports. The composite data sets of the generated reports are variable and can be defined, for instance, as user or system input, a report editor, or a generic export/import mechanism to load pre-defined data sets.

The Data Management module (400i) is responsible for general data management to facilitate the functionality of all other Data Processing modules. The implementation of the Data Management module will resemble, but is not limited to, a database management system.

The Remediation Controls module (400j) provides energy usage remediation services by processing profiles generated by the Profiling Engine (400g), the Report Generator (400h), user defined load controls and real-time user remediation requests. The functionality of the Remediation Controls module can be extended to dynamically analyze and help remediate newly discovered energy usage issues as they may arise.

The user interface component (400k) presents the graphical, textual and auditory information through which the Software (400) presents the user electrical usage data as well as management and remediation controls, additionally providing the control sequences (such as keystrokes with a keyboard, mouse movements, and selections with the touch screen) the user employs to control the Software (400).

As shown in FIG. 5 there is provided a high level diagram of the described management and display console appliance (Console) (500) responsible for hosting the Software (500e) and providing all the hardware interfaces necessary to facilitate implementing a human interactive interface to the described invention. As is common to modern personal computers (PC), the described Console (500) includes a multitude of physical input/output interfaces (500a) providing connectivity to serial devices such as USB, RS-232 or PS2 peripherals, common multi-media interfaces including audio and video interconnects and other interfaces common to PC type computers. The main user interface, for both the display of data and the input of data by users is a touch screen display overlay (500b) which has the ability to display and receive information on the same screen. The effect of said overlay allows the display to be used as an input device, removing the need for an discrete keyboard and/or mouse as the primary input device for interacting with the Console, though I/O interfaces (500a) are provided for such traditional input devices. Additional interfaces are included for communication over power lines (500h) and communication of an IP type network (500i). The power line communication interface (500h) may be integrated into or in-line with the Consoles power supply (500g), and providing connectivity between the Software (500e) and Nodes, other Consoles (500) and any additional resources on the connected electrical system capable of communication in a like protocol. The IP interface (500i) providing communication over a local or wide area network via either WiFi or a wired type medium and facilitating communication with resources, such as connected Consoles (500) local or remote computer systems with or without Software (500e) installed or centralized servers or services provided on either the local network or a wide area network such as the Internet. The preferred embodiment of the Console (500) also including the installation of the inventive Software (500e) to the local non-volatile data storage (500d) for processing, managing and displaying data as well as controlling communication and other processes required by the described invention. Managing the execution of Software (500e) instructions and the general processing of Console operations is the central processing unit (CPU) (500c) and its associated volatile memory (500f). The described components comprising the management and display Console.

As shown in FIG. 6 presented is a diagram of a typical personal type computer system (PC) (600) with the described Software (600e) installed to facilitate the management of electrical energy usage data and associated Nodes, Consoles and other resources attached to the local electrical system and capable of communicating in a like protocol. As is typical of common PC type computers (600), there is included a central processing unit (CPU) (600b) associated volatile memory and non volatile memory for data storage, such as a hard drive (600c), to which the inventive Software (600e) is installed. Common input/output interfaces (600g) are also included, providing connectivity to serial devices such as USB, RS-232 or PS2 peripherals, common multi-media interfaces including audio and video interconnects and other interfaces common to PG type computers. IP type communication may be provided by an ethernet, WiFi (802.11*) or other type of IP communication interfaces (600h) if communication with resources not restricted to communication over the power lines is desired, including communication with local or remote (50,51) resources is desired. If the local display of data is required the PC may include a connected display monitor (600a), though this is not a requirement of the Software (600e). To facilitate the described Software (600e) communicating with Nodes, Consoles or other resources attached to the local electrical system a power line communication bridge (30) is required. This apparatus may sit in-line to the PC's (600) power supply cable (600i), be integrated into the power supply (600f) or be interfaced with the local electrical system in some other manner, such as plugging directly into it via a common electrical wall outlet (210). The communication bridge (30) must additionally interface the PC (600) over one of the available communication or input/output interfaces such as a USB port.

Use Case

The following Use Case(s) are used primarily to capture the high level user-functional requirements of the proposed system. This section provides a description of each section in the use case template.

Actor:

An actor is a person or other entity external to the hardware and software system being specified who interacts with the system and performs use cases to accomplish tasks. Different actors often correspond to different user classes, or roles, identified from the customer community that will use the product. Description: A brief description of the reason for and outcome of this use case, or a high-level description of the sequence of actions and the outcome of executing the use case.

Preconditions:

List any activities that must take place, or any conditions that must be true, before the use case can be started.

Postconditions:

Describe the state of the system at the conclusion of the use case execution.

Normal Case:

Provides a detailed description of the user actions and system responses that will take place during execution of the use case under normal, expected conditions. This dialog sequence will ultimately lead to accomplishing the goal stated in the use case name and description.

Alternative Case:

Documents other, legitimate usage scenarios that can take place within this use case. States the alternative flow, and describes any differences in the sequence of steps that take place.

APPENDIX

| | |
|---|---|
| Actors: | Residential home owner "User"<br>Touch screen display console "Console" |
| Description: | User interacts with a management and display console (Console) running the proposed software system (Software). The console being a 10 inch touch screen flat panel display hung on the wall like a picture frame; the user, as leaving for work, notes a red glow emanating from around the frame of their energy usage display Console. Noting this as irregular the user addresses the display console for the state of electrical energy usage and is informed that usage has exceeded a set threshold. The system queries whether the User would like to bring energy usage to a preferred level. User touches the Console touch screen over an icon promoting remediation of usage and immediately several lights, appliances and computer peripherals in the home are turned off and the power to the ceiling fan changes duty cycles to a 'brown power' profile. The back-lighting on the Console flashes green, the displayed state changes to moderate electrical energy usage and usage data/statistics are updated, including presentation of the projected effects of this |

APPENDIX-continued

| | |
|---|---|
| | remediation. |
| Preconditions: | 1. One or more Nodes and Consoles have been implemented in the Users electrical system. |
| | 2. The Software running on the Console has been configured, including Users utility billing information. |
| | 3. User is authorized to issue remediation commands from the Console |
| | 4. The Console is announcing the state of electrical energy usage as having surpassed a high usage threshold, an example of which would be an LED back-lighting system illuminating red. |
| Postconditions: | 1. Load devices either manually or dynamically selected for remediation have been switched off or relegated to a lower duty cycle thus drawing less electrical energy from their attached circuit; for some term. |
| | 2. ThConsole is announcing the state of electrical energy usage as having fallen bellow a high usage threshold. |
| | 3. The Console is displaying the projected effects of the remediation performed. |
| Normal Case: | 1.0 Typical Console use. |
| | 1. User begins interacting with Console by engaging the touch screen. |
| | 2. User navigates through the UI, viewing usage data. |
| | 3. The User initiates remediation or other potentially privilaged action. |
| | 4. System performs requested action. |
| | 5. System updates usage data/statistics. |
| Alternative Case: | 1.1 Restricted Console (Branch after step 1.0.3) |
| | 1. System notifies User of policy restricting the attempted operation and offers to authenticate User. |
| | 2. User provides credentials. |
| | 3. System authenticates User. |
| | 4. System performs requested action. |
| | 5. System updates usage data/statistics. |
| | 1.2 Restricted Console (Branch after step 1.0.3) |
| | 1. System notifies User of policy restricting the attempted operation and offers to authenticate User. |
| | 2. User provides credentials. |
| | 3. User fails authentication. |
| | 4. System does not perform the requested action. |
| Assumptions: | |
| Notes and Issues: | This document does not reflect a tried Use Case study, but a 'casual-dressed' Essential Use Case. |

While the above description contains many specifics, these should not be construed as limitations on the scope of the invention, but rather as exemplifications of one or another preferred embodiment thereof. Many other variations are possible, which would be obvious to one skilled in the art. Accordingly, the scope of the invention should be determined by the scope of the appended claims and their equivalents, and not just by the embodiments.

What is claimed is:

1. A method of an electrical energy management system for monitoring, storing and processing electrical energy usage data and for controlling electrical energy usage at a site, the energy management system method comprising:

providing a programmable management console having an electrical system management software operating capacity and management system software installed on the console, the management console interfacing with a user interface component device;

establishing a data communication connection between the management console and an electrical energy sensor Node of the management system;

receiving communicated data, including Node data, via the communication connection by a Transport module of the software;

authenticating and compressing the communicated data by an Authentication/Security module and then by a Data Collection/Compression module;

acting on the communicated data by sending it to a Real-Time Event Engine for caching and for real-time display and user action, and to a Data Storage module for further processing and/or storage; and processing the communicated data to extract Node data from the communicated data for further processing, storage and/or display to enable a user to monitor and control electrical energy usage at the site.

* * * * *